Figure 1:
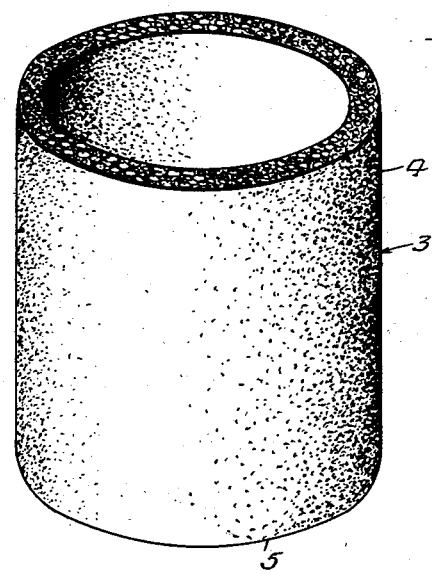

Jan. 30, 1945.  R. E. WOOD  2,368,190
RUBBER COMPOSITION
Filed July 24, 1942

Inventor
Raymond E. Wood
By Thed Gerlach
Atty.

Patented Jan. 30, 1945

2,368,190

UNITED STATES PATENT OFFICE 2,368,190

RUBBER COMPOSITION

Raymond E. Wood, Downers Grove, Ill., assignor, by mesne assignments, to Van Cleef Bros., Chicago, Ill., a firm consisting of Noah Van Cleef, Felix Van Cleef, Paul Van Cleef, Frances G. Van Cleef, Ruth Van Cleef, and Jeanne Van Cleef Application July 24, 1942, Serial No. 452,148

2 Claims. (Cl. 260—724)

The present invention relates generally to rubber composition. More particularly the invention relates to that type of rubber composition which is known as "sponge" or "cellular" rubber and is characterized by the fact that it has throughout the body thereof a plurality of small communicating pores or cells of varying sizes whereby it is rendered extremely light in weight as well as soft and resilient.

One object of the invention is to provide a rubber composition of this type which is an improvement upon, and has greater capabilities of use than, previously designed compositions of the same general character by reason of the fact that it includes a filling or admixture of metallic powder or dust which has comparatively high heat conductivity and serves materially to strengthen or toughen the composition and also to dissipate or transfer heat to the end that the composition as a whole has longer life than plain or conventional sponge rubber.

Another object of the invention is the provision of a rubber composition of the type and character under consideration in which the powdered metal constituting the filling or admixture is distributed substantially uniformly throughout the rubber component or constituent and is in such amount that the particles or grains thereof are in contact with one another.

A still further object of the invention is to provide a rubber composition of the sponge variety which is generally an improvement in the art and is characterized by low cost of manufacture, long life, and resistance to deterioration and shrinkage.

Other objects of the invention and the various advantages and characteristics of the present rubber composition will be apparent from a consideration of the following detailed description.

The invention consists in the several novel features which are hereinafter set forth and are more particularly defined by claims at the conclusion hereof.

Figure 2:
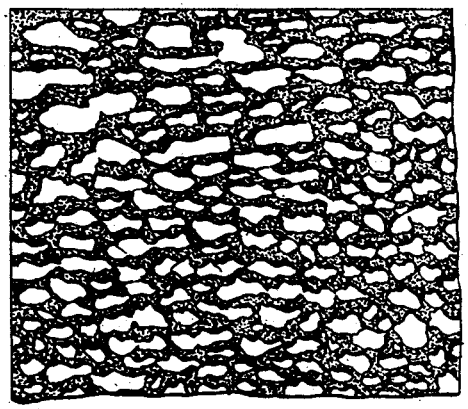

In the drawing which accompanies and forms a part of this specification or disclosure:

Figure 1 is a perspective view of a cup-shaped shell which is formed of the improved rubber composition and is primarily designed for use as a casing for an electrical operating unit for a radio receiving set, such, for example, as a vibratory or interrupter type converter; and Figure 2 is an enlarged section of the composition showing the manner in which the powdered metal of high heat conductivity is distributed uniformly throughout the rubber component of the composition and the grains or particles thereof are in contact with one another.

The improved rubber composition is essentially of the sponge or cellular variety and is formed of sponge rubber and a filling or admixture of aluminum metal powder or like pulverulent metal having a high heat conductivity. It is molded, as hereinafter described, and has throughout the body thereof numerous small communicating pores of varying sizes (see Figure 2). The filling has several purposes. In the first place, it serves to transfer heat from the mold to the composition forming material in connection with molding and vulcanization of the material and hence materially reduces the molding time. Secondly, it constitutes a medium whereby the composition as a whole, i. e., the composition after molding and vulcanization, has pronounced heat transfer properties or characteristics. In the third place, the filling serves to resist deterioration and decomposition of the composition when it is subjected to comparatively high temperatures.

The composition is preferably made of the following ingredients in substantially the proportions or amounts specified:

|  | Pounds | Ounces |
| --- | --- | --- |
| Plantation rubber | 50 |  |
| Zinc oxide | 1 | 8 |
| Stearic acid | 2 | 8 |
| Antioxidant |  | 8 |
| Soda bicarbonate | 7 | 8 |
| Petrolatum | 13 |  |
| Tetramethylthiuram disulphide | 1 | 12 |
| Aluminum metal powder | 10 |  |

These ingredients are milled in an open roll type mill for approximately forty-five minutes. The stearic acid when subjected to the heat of the mold reacts with the soda bicarbonate to produce carbon dioxide within the mass and such gas results in the final product or composition having numerous minute communicating pores. The tetramethylthiuram disulphide constitutes a sulphur bearing accelerator and serves to cure the rubber during the molding operation. The zinc oxide content of the mass operates to activate the accelerator, i. e., the tetramethylthiuram disulphide. The petrolatum functions as a softener for the rubber and serves to disperse the solid material throughout the rubber during milling of the mass. It also functions or serves to make the mass plastic and to give the final product softness and resiliency. The antioxidant serves to absorb oxygen in the mass and hence prevents oxidation of the rubber. After milling the various materials for a sufficient period of time to produce a homogeneous plastic mass a portion of the mass is inserted into the mold while the latter is in a pre-heated condition. The mold cavity is but partially filled. When the material encounters the heat of the mold it expands and becomes sponge-like in character. The material is permitted to remain in the mold for a period of time ranging between six to fifteen minutes, depending upon the size or thickness of the final product. The mold is preferably heated to approximately 300° F. While the material is in the mold the rubber is cured. After vulcanization or curing the material is removed from the mold and constitutes the improved rubber composition. The aluminum powder is evenly or uniformly dispersed throughout the sponge rubber component of the composition and serves not only as a heat dissipating medium but also to stiffen and prolong the life of the rubber. It does not react chemically with any of the other ingredients of the material of which the composition is formed and hence is in the form of free aluminum in the rubber. Instead of powdered metal aluminum any other powdered metal having high heat conductivity may be used. For example, powdered zinc may be employed in lieu of powdered aluminum. If powdered metal aluminum is used as the filling, best results are obtained when it is in the form that is used in connection with aluminum paint. The amount of aluminum metal powder may be varied although it has been found that extremely satisfactory results are obtained when the powdered aluminum is approximately 20% by weight of the amount of rubber. It has been found that proportions of about 5% or 10% by weight or up to 40% or 50% may be employed. When the amount of powdered aluminum or like metal is 5% by weight of the rubber component, or above, the powder is in such amount that the grains or particles contact with one another. Due to the fact that the grains or particles are in contacting relation throughout the rubber the composition has exceptional ability to transfer or dissipate heat.

The improved composition is particularly adapted for use as a mounting material, especially in instances where the item or device to be mounted generates heat and it is desired to transfer heat to the base or supporting structure. By reason of the fact that the composition includes the filling or admixture of aluminum or like metallic powder any heat which is transferred to the composition is quickly or immediately dissipated with the result that the rubber component is not likely to deteriorate and has a comparatively long life. Figure 1 of the drawing shows or illustrates a cup-shaped shell 3 which is formed of the improved rubber composition and is designed for use as a casing for an electrical operating unit for a radio receiving set, such, for example, as a vibratory or interrupter type converter or a thermionic tube. The shell is molded and consists of an annular side wall 4 and an integral disc-like end wall 5. It is contemplated that the shell when used for the purpose hereinbefore set forth will surround the operating unit and be in contact with the inner face of the usual cup-shaped metal housing. Due to the presence of the filling or admixture of aluminum powder any heat which is generated by the unit is quickly transferred to the metallic housing. In addition, the presence of the filling of powdered aluminum or like metal produces certain electrical shielding effects for the unit with which the shell is used.

The herein described rubber composition has many capabilities of use and may be manufactured at a comparatively low and reasonable cost. It effectively and efficiently fulfills its intended purpose and is characterized by the fact that the filling of powdered aluminum or like metal not only strengthens the composition as a whole but also gives it pronounced heat transfer properties.

The invention is not to be understood as restricted to the precise or particular details set forth since these may be modified within the scope of the appended claims without departing from the spirit and scope of the invention.

This application is a division in part of an application for United States Letters Patent filed by me on December 30, 1940, Serial No. 372,251 (now Patent No. 2,313,379, dated March 9, 1943).

Having thus described my invention what I claim as new and desire to secure by Letters Patent is:

1. As a new composition of matter, a sponge rubber matrix and a filling or dispersion of aluminum metal powder distributed substantially uniformly throughout the rubber matrix, the powder to rubber ratio by weight being approximately 1 to 5.

2. A new composition of matter formed by molding in the presence of heat and in an oversized mold a plastic mass comprising the following ingredients in substantially the proportions specified:

| | Parts by weight |
|---|---|
| Milled rubber | 50.00 |
| Zinc oxide | 1.50 |
| Stearic acid | 2.50 |
| Antioxidant | .50 |
| Soda bicarbonate | 7.50 |
| Petrolatum | 13.00 |
| Tetramethylthiuram disulphide | 1.75 |
| Aluminum metal powder | 10.00 |

RAYMOND E. WOOD.